United States Patent
Jiang et al.

(10) Patent No.: US 6,709,107 B2
(45) Date of Patent: Mar. 23, 2004

(54) COMPOSITE OPHTHALMIC LENS AND METHOD FOR OBTAINING SAME

(75) Inventors: Peiqi Jiang, Kanagawa (JP); Stéphane Cabeza, Kanagawa (JP); Gilbert Menduni, Tokyo (JP)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 0 days.

(21) Appl. No.: 10/037,802

(22) Filed: Oct. 29, 2001

(65) Prior Publication Data

US 2002/0164484 A1 Nov. 7, 2002

Related U.S. Application Data

(63) Continuation of application No. PCT/FR00/01160, filed on Apr. 28, 2000.

(30) Foreign Application Priority Data

Apr. 29, 1999 (FR) ............................................ 99 05466

(51) Int. Cl.[7] .................................................. G02C 7/10
(52) U.S. Cl. ..................... 351/176; 351/44; 351/163; 351/164; 351/166; 351/167; 351/168; 351/169; 428/412; 428/423.1; 428/704
(58) Field of Search ................ 428/412, 423.1, 428/704; 351/44, 159, 160, 161, 163, 164, 166, 167, 168, 169, 176

(56) References Cited

U.S. PATENT DOCUMENTS

| | | | |
|---|---|---|---|
| 3,248,460 A | 4/1966 | Naujokas et al. | |
| 4,190,621 A | 2/1980 | Greshes | 264/1 |
| 4,211,823 A | 7/1980 | Suzuki et al. | 428/412 |
| 4,873,029 A | 10/1989 | Blum | 264/1.3 |
| 5,147,585 A | 9/1992 | Blum | 264/1.4 |
| 5,178,800 A | 1/1993 | Blum | 264/1.4 |
| 5,512,371 A | 4/1996 | Gupta et al. | 428/412 |
| 5,635,580 A * | 6/1997 | Kosaka et al. | 528/58 |
| 5,907,386 A * | 5/1999 | Gupta et al. | 351/177 |
| 6,051,310 A * | 4/2000 | Cano et al. | 428/336 |
| 6,086,203 A * | 7/2000 | Blum et al. | 351/169 |

FOREIGN PATENT DOCUMENTS

| | | |
|---|---|---|
| EP | 0726138 | 8/1996 |
| EP | 0761665 | 3/1997 |
| EP | 0785194 | 7/1997 |
| EP | 0801320 | 10/1997 |
| FR | 2689654 | 10/1993 |
| FR | 2702486 | 9/1994 |
| WO | WO 93/21010 | 10/1993 |
| WO | WO 97/33742 | 9/1997 |
| WO | WO 98/03894 | 1/1998 |

* cited by examiner

Primary Examiner—James J. Seidleck
Assistant Examiner—Travis B Ribar
(74) Attorney, Agent, or Firm—Fulbright & Jaworski L.L.P.

(57) ABSTRACT

The composite ophthalmic lens (1) comprises a first layer (2), at least 200 micrometers thick, forming a front part of said lens, of a first polymeric material of refractive index higher than or equal to 1.60 and having a front face (4) constituting a front optical surface S1, and a second layer (3), at least 200 micrometers thick, of a second polymeric material forming a rear part of said lens and having a rear face (6) constituting a rear optical surface S2, the interface (5) between these two layers constituting an optical surface S3 parallel to the rear optical surface S2.

20 Claims, 1 Drawing Sheet

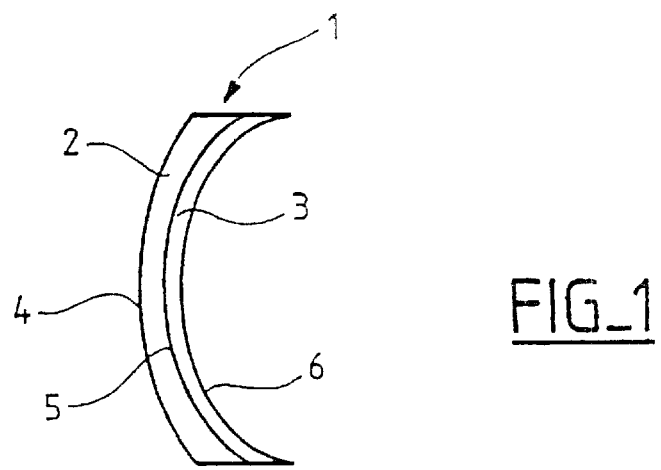
FIG_1
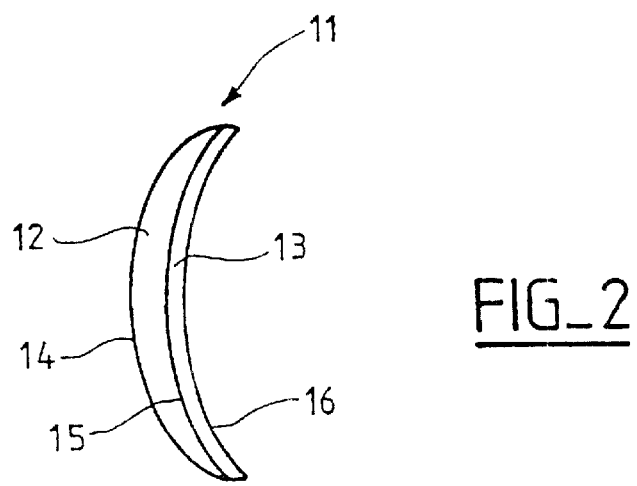
FIG_2
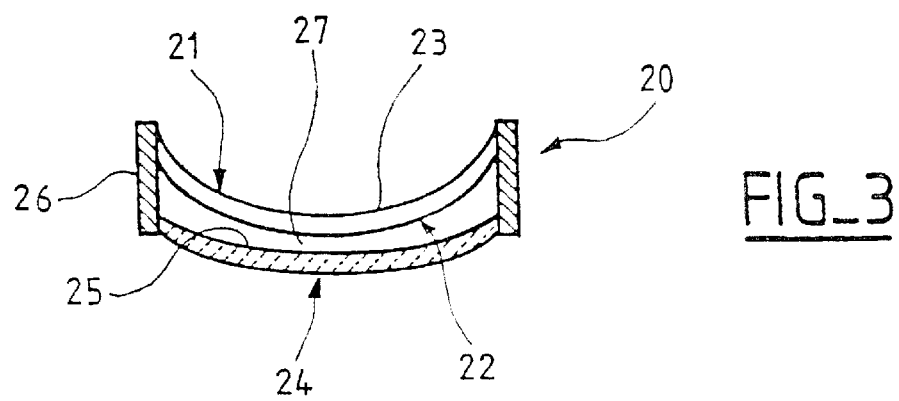
FIG_3

COMPOSITE OPHTHALMIC LENS AND METHOD FOR OBTAINING SAME

This application is a continuation of PCT Application No. PCT/FR00/01160 filed Apr. 28, 2000, which claims priority to French Application No. 99/05466 filed Apr. 29, 1999.

The present invention relates to the field of composite ophthalmic lenses made, in particular, of organic polymeric materials.

Ophthalmic lenses, and especially spectacle lenses, are optical lenses used for the modification or correction of the vision of patients, in particular of those suffering from defects of vision such as ametropias or presbyopia.

The properties that such lenses must possess are numerous.

They must have optical surfaces of high quality, possess a high degree of transparency and lead to a minimum of optical or chromatic aberrations while remaining thin and light. The lenses must also be resistant to abrasion, shock, to static constraints and be capable of being tinted at the request of the client.

Composite ophthalmic lenses, comprising several layers of organic (and possibly mineral) material have been known for a long time.

They have the merit of taking advantage of the intrinsic properties of each of the materials used.

Moreover, and in a general manner, the process for obtaining them is flexible and is particularly attractive for obtaining ophthalmic lenses combining several optical surfaces for vision correction.

In particular, in order to obtain them, it is possible to use a preform possessing a certain optical power and to mould on to this preform a layer of material, the geometry of the surface of which will modify the initial correction contributed by the preform.

This technique is adapted to construct, for example, a lens comprising a multifocal powered area at the front face, designed to correct presbyopia and, at the rear face, a toric surface designed to correct an astigmatism.

In this case, a layer is moulded on to the front face of a performed lens comprising a rear toric surface. The layer is moulded such that it confers a multifocal power correction on the final lens.

The final desired article is thus obtained without having to carry out a surface processing operation.

This process is described in the prior art, with many variants.

The U.S. Pat. No. 3,248,460 describes a process for obtaining a composite bifocal lens made of organic material, starting from a perform or basic lens, already possessing a certain optical power.

The material to be moulded is placed in a mould, one of the parts of which is constituted by this basic lens.

The material to be moulded is polymerised so as to obtain, by addition of ancillary material to the basic lens, a composite lens of greater power than the basic lens.

This patent gives only a few details concerning the choice of materials to be used.

The U.S. Pat. No. 4,190,621 describes a process for obtaining toric and bifocal lenses.

This process consists of moulding a fine film of material on to a toric, unifocal perform.

The mould used has the same radius of curvature as the preform and a hollow part, the geometry of which is complementary to the geometry of the bifocal area desired in the final composite lens. The moulding is performed on the front face.

In practice, the material to be moulded described is constituted essentially of a monomer of the diethylene glycol diallylcarbonate type, known by its trade name CR39®.

The U.S. Pat. No. 4,873,029 describes composite lenses with a tinted layer.

The lenses are also produced starting from CR39®.

The U.S. Pat. Nos. 5,147,585 and 5,178,800 describe processes for obtaining composite ophthalmic lenses starting from preforms already possessing a first initial correcting power.

The materials used are the polymers obtained starting from CR39® or HIRI® (allyl monomer leading to a polymer with a refractive index of the order of 1.55).

Other materials such as polycarbonate or polymers obtained from styrene derivatives, among others, are mentioned.

The patent application WO-93/21010 describes a composite lens comprising in front an optical preform at least 100 micrometers thick and the hardness of which is at least that of a bare CR39® material and a polymeric layer at the rear the resistance to shock of which is at least that of a bare CR39® material.

The process recommended for obtaining the composite lens is the moulding of the film resistant to shock on to the rear face of the preform.

The U.S. Pat. No. 5,512,371 describes a composite lens comprising an optical quality preform and a hardened part made of organic material, adhering to this preform having a higher resistance to abrasion than the preform and a lower chromatic aberration.

The patent describes more particularly the case of a polycarbonate preform, on the front face of which has been deposited a material of the CR39® type.

The patent application WO-98/03894 describes an ophthalmic lens constituted by the combination of two optical elements of opposite powers leading to a lens with a high Abbe number. The material constituting the optical element of the front part may be a high index polymer obtained from a monomer derived from styrene or divinylbenzene.

The composite lenses described in the prior art possess a certain number of serious drawbacks:

The composite lenses are usually thicker than the lenses obtained from a single basic material, whereas the wearers look for lenses as thin as possible for aesthetic reasons.

Usually, the materials used for the different layers constituting the composite lens possess different refractive indices, and this may lead to optical aberrations.

Usually also, the moulding material undergoes a considerable degree of shrinkage on polymerisation, after being placed in contact with the preform, and this leads to internal tensions within the composite lens which may make the latter more fragile.

In addition, as the preform is thin, these tensions may also lead to uncontrollable deformations of the optical surface of the latter, which it is impossible to correct.

The objective of the present invention is to provide a composite ophthalmic lens and a process for obtaining the latter which resolve the above problems.

The composite ophthalmic lens according to the invention comprises adjacent first and second layers defining between them an interface:

the first layer, at least 200 micrometers thick, of a first polymeric material with a refractive index of at least 1.60, and preferably greater or equal to 1.65 forms a front part of said lens and has a front face constituting a front optical surface S1, the second layer, at least 200 micrometers thick, of a second polymeric material forms a rear part of said lens and has a rear face constituting a rear optical surface S2, and the interface between these two layers constitutes an optical surface S3 and is parallel to the rear face of the second layer.

Preferably, the front optical surface S1 is a multifocal, i.e. at least bifocal, or progressive surface whereas the rear optical surface S2 is spherical or toric.

In the context of the present application, a distinction is made between the front and rear parts and the front and rear faces of the composite lens or of one of the layers constituting the composite lens, by taking as reference the eye of the wearer for whom the lens is designed under the normal conditions of use of this lens.

The front part or front face of the lens or of a layer included in this lens is the part, face or layer furthest from the eye of the wearer. The rear part or rear face or rear layer is the part, face or layer closest to the eye.

By optical surface is meant a surface of optical quality.

By progressive surface is meant a surface which comprises at least an area conferring progressive power correction.

Overall, the composite lens according to the invention comprises a front part constituted by a first layer of a very high refractive index which confers, through the intermediary of its two optical surfaces S1 and S3, the entire corrective capacities of the lens.

The second layer forming the rear part of the composite lens constitutes a so-called "plane" lens or lens element, i.e. the two faces that delimit it, constituting the optical surfaces S2 and S3, are parallel faces and this second layer thus contributes, overall, no appreciable modification to the correction contributed by the first layer of very high refractive index.

It is thus possible to use for the material constituting the second layer a material of appreciably lower refractive index than that of the first layer without modifying appreciably the optical function of the first layer (i.e. the characteristics of optical power and optical aberrations. Optical aberrations include the power defects, the chromatic aberrations and the astigmatism).

Moreover, using a material of high index makes it possible to diminish the thickness of the layer forming the front part of the lens and, consequently, that of the final lens.

Preferably, the composite ophthalmic lens according to the invention is such that the second layer forming the rear part of the lens is a preform, on the front face of which the first layer of the first polymeric material has been hardened.

In this preferred embodiment, it is seen that it is the front face of the preform which determines the geometry of the optical surface S3, i.e. also the rear optical surface of the first layer with high refractive index and hence the optical power of the final composite lens.

As indicated previously, the lens according to the invention comprises a front part constituted of a material of particularly high refractive index of at least 1.60, preferably higher than or equal to 1.65, even better, higher than 1.67 and, better still, equal to or higher than 1.7.

The preferred materials are materials containing sulphur, for example episulfide-based polymeric materials such as described in the patent applications EP-761665 and EP-785194 or polythiourethane-based materials or also materials obtained by reaction between isothiocyanates and polythiols.

The episulfide-based materials are attractive because their very high refractive index is combined with good resistance to abrasion.

The episulfide groups are groups containing the cyclic unit:

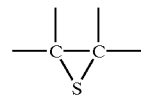

Preferred episulfides are compounds which contain two or more functional groups corresponding to the formula:

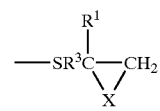

where X represents S or O, the numerical proportion of S, on average, being 50% or more compared with the total number of S and O constituting the three-membered ring, and $R^1$ and $R^3$ are as defined below.

Preferably, X represents a sulphur atom.

The preferred episulfides are diepisulfides of formula:

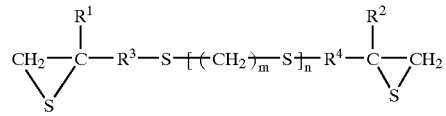

in which $R^1$ and $R^2$ are, independently, H, an alkyl, aryl, alkoxy, aryloxy, alkylthio or arylthio group; $R^3$ and $R^4$ are independently,

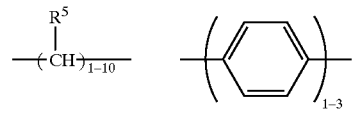

$R^5$ represents H, an alkyl, aryl, alkoxy, aryloxy, alkylthio or arylthio group, n is an integer from 0 to 4 and m is an integer from 0 to 6.

A preferred class of diepisulfides comprises the diepisulfides of formula:

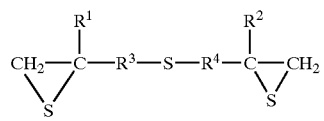

In which $R^1$, $R^2$ $R^3$ and $R^4$ are defined as above.

Another preferred class of diepisulfides comprises the diepisulfides of formula:

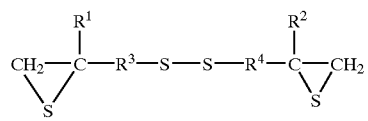

In which $R^1$, $R^2$, $R^3$ and $R^4$ are defined as above.

The alkyl and alkoxy groups represented by $R^1$, $R^2$, $R^3$ and $R^4$ are preferably $C_1$–$C_6$ groups and, better still, $C_1$–$C_4$ such as methyl, ethyl, propyl, butyl, methoxy, ethoxy, propoxy and butoxy groups.

The preferred diepisulfides are:

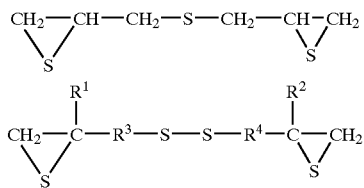

The second material constituting the second layer forming the rear part of the lens may be selected from (meth) allylic-, (meth)acrylic- and thio (meth)acrylic-based polymeric materials, poly(thio)urethanes and the thermoplastic polycarbonates.

Preferably, the second material possesses a refractive index higher than or equal to 1.54.

Preferably, the second material constituting the second layer has a refractive index lower than the first material forming the first layer. The difference in refractive index between the first material constituting the first layer and the second material constituting the second layer is usually at least 0.05 and, better still, 0.10.

The preferred materials are the polycarbonates, the polythiourethanes and the polyallylics.

Preferred of these latter are:
  the materials obtained by polymerisation of monomers derived from diethylene glycol bis allyl carbonate,
  the thermoplastic polycarbonates with bisphenol-A unit,
  the polythiourethanes.

The second material is preferably selected such that it improves the overall mechanical properties of the final composite lens, in particular the resistance to shock and also, if that is desired, its ability to be tinted.

The thicknesses at the centre of the two principal layers constituting the composite lens usually vary from 0.2 to 10 mm.

Preferably, the first layer forming the front part of the composite lens has a thickness at the centre of 1 to 10 mm in the case of a lens of positive refractive power, and from 0.2 to 2 mm in the case of a lens of negative refractive power.

Preferably, the second layer forming the rear part of the composite lens has a thickness at the centre of 0.2 to 1 mm.

Preferably, at least one of the two faces constituting the optical surfaces S1, S2 of the composite ophthalmic lens comprises an anti-abrasion hard coating.

Any composition conventionally used for this purpose in the prior art may be used to form this anti-abrasion hard coating layer.

Of the preferred compositions used for the anti-abrasion hard coating mention may be made of the alkoxysilane hydrolysate-based compositions, in particular epoxysilane hydrolysates such as those described in the French patent FR-9,302,649 and the U.S. Pat. No. 4,211,823.

A preferred composition for an anti-abrasion hard coating comprises an epoxysilane hydrolysate and a colloidal filler, such as colloidal silica, $TiO_2$ or $Sb_2O_5$ and a catalyst, preferably an aluminium chelate, such as aluminum acetylacetonate, the remainder being constituted essentially of solvents conventionally used for the formulation of such compositions.

The anti-abrasion hard coating usually is from 2 to 10 micrometers, and preferably from 3 to 6 micrometers, thick.

It is also possible to deposit, if necessary, an anti-reflecting layer on the anti-abrasion hard coating layer(s).

As an example, the anti-reflecting coating may be constituted by a mono- or multi-layer film of dielectric materials such as SiO, $SiO_2$, $Si_3N_4$, $TiO_2$, $ZrO_2$, $Al_2O_3$, $MgF_2$, $Ta_2O_5$ or their mixtures.

It thus becomes possible to prevent the appearance of a reflection at the lens/air surface.

This anti-reflecting coating is usually applied by deposition under vacuum according to one of the following techniques:
  by evaporation, optionally assisted by an ionic beam,
  by cathodic atomisation,
  by ion beam atomisation
  by plasma-assisted, chemical deposition in the vapour phase.

In addition to the deposition under vacuum, it is also possible to envisage a deposition of a mineral layer by the sol/gel approach, for example starting from tetraalkoxysilane hydrolysates.

In the case where the film consists of a single layer, its optical thickness must be equal to $\lambda/4$ where $\lambda$ is a wavelength included between 450 and 650 nm.

In the case of a multi-layer film comprising 3 layers, it is possible to use a combination corresponding to respective optical thicknesses $\lambda,4$-$\lambda/2$-$\lambda/4$ or $\lambda/4$-$\lambda/4$-$\lambda/4$.

It is also possible to use an equivalent film formed by more layers, instead of any one of the layers previously mentioned.

If necessary, it is possible to intercalate an adhesive primer between the anti-abrasion hard coating and the face of the composite ophthalmic lens on which it is desired to apply said coating.

The preferred primers are polyurethane latexes.

The purpose of the invention is also a process for obtaining a composite ophthalmic lens comprising the following steps:
  produce a lens preform having a front face constituting a front optical surface S3 and a rear face parallel to the front face constituting a rear optical surface S2,
  form a moulding cavity delimited by the front face of said preform and a mould element exhibiting a face opposite the said preform and constituting an optical surface S1,
  fill the moulding cavity with a polymerisable composition leading by polymerisation to a material with an index higher than or equal to 1.60,
  carry out the polymerisation of the said polymerisable composition,
  separate said mould element from the composite lens formed and recover said lens.

Preferably, the polymerisation of the polymerisable composition is performed by heating.

The use of a polymerisable composition of high refractive index makes it possible to use a small quantity of material to produce the layer forming the front part of the lens.

Thus, the pressures due to shrinkage on polymerisation of this layer will be minimized and, consequently, so will the possible deformations of the preform.

It is thus possible to use preforms of very thin thicknesses in the process of the invention.

The remainder of the description refers to the appended Figures.

FIG. 1 represents a cross-sectional view of a first composite ophthalmic lens of negative power according to the invention.

FIG. 2 represents a cross-sectional view of a second composite ophthalmic lens of positive power according to the invention.

FIG. 3 represents a cross-sectional view of a mould during the manufacture of a composite lens according to the invention.

A composite ophthalmic lens 1 of negative power according to the invention comprises a first layer 2 forming the front part of said lens 1 and constituted of a material of high refractive index and of a second layer 3 forming the rear part of the lens 1.

The two layers adhere tightly to each other at their interface 5 which constitutes an optical surface S3.

The interface 5 constituting the optical surface S3 is parallel to the rear face 6 of the second layer 3 constituting the rear optical surface S2, such that the second layer 3 is a "plane" lens element.

The front face 4 of the composite ophthalmic lens 1 constitutes a spherical front optical surface S1 and the rear face 6 a spherical rear optical surface S2 (6) of shorter radius of curvature than that of the front optical surface S1 such that the resulting power of the lens 1 is negative.

The process for obtaining such a lens is shown in FIG. 3. A mould 20 is first formed consisting of:
- a preform 21 having a front face 22 constituting a front optical surface S3, identical with the optical surface S3 desired for the interface 5 of the lens, and a rear face 23 parallel to the front face 22 and constituting a rear optical surface S2
- a mould part 24, for example of mineral glass, the internal surface 25 of which is complementary to the front face 4 constituting the front optical surface S1 of the final composite lens 1,
- a joint 26, maintaining in place the preform 21 and the mould part of mineral glass 24.

The joint 26 is separated so as to introduce in to the mould cavity 27 a polymerisable composition leading by polymerisation to a polymer with a high refractive index.

The polymerisation is then performed, preferably by heating the polymerisable composition.

After separation from the mould part 24, the composite ophthalmic lens 1 is obtained.

A composite ophthalmic lens of positive power 11 is shown in FIG. 2. It comprises a first layer 12, forming the front part of said lens 11 and constituted of a material of high refractive index and a second layer 13 forming the rear part.

The two layers 12 and 13 adhere tightly to each other at their interface 15 constituting the optical surface S3.

The interface 15 constituting the optical surface S3 and the rear face 16 constituting the rear optical surface S2 are parallel such that the second layer 13 constitutes a "plane" lens element.

The front face 14 of the composite ophthalmic lens 11 constitutes a spherical front optical surface S1 and the rear face 16 a spherical rear optical surface S2 with a radius of curvature larger than that of the front optical surface S1 such that the resulting power of the lens 11 is positive.

This lens 11 can be obtained as described above but by using a mould part of appropriate configuration.

The invention is illustrated by the examples below:

EXAMPLE 1

Construction of a composite ophthalmic lens of negative power (−2.00 dioptres) starting from a polythiourethane preform constituting a "plane" lens element.

A polythiourethane preform (obtained by thermal polymerisation in a mineral glass mould of a mixture of pentaerythritol tetrakis (3-mercaptopropionate) and xylene diisocyanate in a mass ratio of 1.3/1) 0.6 mm thick and radius of curvature 122.5 cm is used.

As shown in FIG. 3, a mould is formed constituted of a mineral glass mould part exhibiting an optical surface with a radius of curvature 187.4 cm and the above preform, the assembly being maintained by a peripheral adhesive tape.

A polymerisable episulfide-based composition containing an amine as initiator is introduced into the above mould.

The mould is then subjected to a thermal polymerisation cycle for a duration of 23 hours during which the temperature varies from 30 to 100° C.

After separation from the mineral glass mould part, the composite lens of power −2.00 dioptres and 1.3 mm thick at the centre is recovered.

The optical appearance of the glass is visually excellent.

The material of the layer constituting the front part of the composite ophthalmic lens possesses a refractive index of 1.71.

The composite lens successfully passes the FDA test for resistance to shock (no rupture after 100 g bead falls from a height of 1.27 m).

It can be tinted on its rear surface in standard tinting baths.

EXAMPLE 2

A composite ophthalmic lens of positive power (+2.00 dioptres) is constructed by operating in the same manner as in Example 1 above, but by using a preform constituting a "plane" lens element of CR39® 0.6 mm thick and exhibiting a radius of curvature of 291 cm.

EXAMPLE 3

This Example relates to the construction of a photochromic composite lens.

A preform is constructed consisting of a lens of power −6.00 dioptres, 1.20 mm thick at the centre.

This preform is constructed by moulding a diepisulfide-based polymerisable composition between two mineral glass mould parts.

The refractive index of the preform obtained after removal from the mould is 1.70.

The preform is then assembled with the mineral glass mould part having served to mould the rear face of this preform, the assembly defining a moulding cavity of 0.5 mm uniform thickness between the rear face of the preform and the optical surface of the mould part.

The assembly is maintained by an adhesive tape attached around the cross-section of the mould, the adhesive tape ensuring impermeability.

A monomer constituted essentially of diethoxy bisphenol-A dimethacrylate and polyethyleneglycol dimethacrylate, a monomer to which is added 0.16% by weight of a photochromic compound of the naphthopyran type, is introduced into the moulding cavity above, then it is polymerised by UV.

After removal from the mould a photochromic composite ophthalmic lens is obtained of 1.7 mm total thickness and optical power −6.00 dioptres.

What is claimed is:

1. A composite ophthalmic lens comprising a first layer and a second adjacent layer defining between them an interface wherein:

the first layer forms a front part of the lens, is at least 200 micrometers thick, is comprised of a first polymeric material of refractive index higher than or equal to 1.60, and comprises a front face constituting a front optical surface S1;

the second layer forms a rear part of said lens, is at least 200 micrometers thick, is comprised of a second polymeric material, and comprises a rear face constituting a rear optical surface S2; and the interface is further defined as an optical surface S3, which is parallel to the rear face of the second layer.

2. The ophthalmic lens of claim 1, wherein the second polymeric material has a refractive index lower than the first polymeric material.

3. The method of claim 2, wherein the difference between the refractive indices of the first and second materials is at least 0.05.

4. The method of claim 3, wherein the difference between the refractive indices of the first and second materials is at least 0.10.

5. The ophthalmic lens of claim 1, wherein the front optical surface S1 is a multifocal optical surface.

6. The ophthalmic lens of claim 1, wherein the front optical surface S1 is a progressive optical surface.

7. The ophthalmic lens of claim 1, wherein the rear optical surface S2 is a spherical optical surface.

8. The ophthalmic lens of claim 1, wherein the rear optical surface S2 is a toric optical surface.

9. The ophthalmic lens of claim 1, wherein the first layer has a center thickness of 0.2 to 10 mm.

10. The ophthalmic lens of claim 1, wherein the second layer has a center thickness of 0.2 to 1 mm.

11. The ophthalmic lens of claim 1, wherein the refractive index of the first polymeric material is higher than or equal to 1.65.

12. The ophthalmic lens of claim 11, wherein the refractive index of the first polymeric material is higher than or equal to 1.67.

13. The ophthalmic lens of claim 12, wherein the refractive index of the first polymeric material is higher than or equal to 1.7.

14. The ophthalmic lens of claim 1, wherein the first polymeric material comprises a material containing sulphur.

15. The ophthalmic lens of claim 14, wherein the first polymeric material comprises a polythiourethane or episulfide polymer.

16. The ophthalmic lens of claim 1, wherein the second polymeric material comprises a poly (allyl carbonate), a polyurethane, a polythiourethane, and/or a polycarbonate.

17. The ophthalmic lens of claim 1, further defined as comprising an anti-abrasion coating deposited on at least one of the front face and the rear face.

18. The ophthalmic lens of claim 17, further defined as comprising an anti-dazzle coating deposited on the anti-abrasion coating.

19. The ophthalmic lens of claim 17, further defined as comprising an adhesive primer between at least one of the front face and the rear face and the anti-abrasion coating deposited on at least one of the front face and the rear face.

20. The ophthalmic lens of claim 1, wherein the second layer is a preform comprising a front face on which the first layer of the first polymeric material has been hardened.

* * * * *

UNITED STATES PATENT AND TRADEMARK OFFICE
CERTIFICATE OF CORRECTION

PATENT NO. : 6,709,107 B2
DATED : March 23, 2004
INVENTOR(S) : Peiqi Jiang, Stéphane Cabeza, and Gilbert Menduni It is certified that error appears in the above-identified patent and that said Letters Patent is hereby corrected as shown below:

<u>Title page,</u>
Item [75], Inventors, please delete "Kanagawa (JP)" and insert -- Palm Harbor (FL) -- therefor; please delete "Kanagawa" and insert -- Tokyo -- therefor.

Signed and Sealed this

Thirteenth Day of July, 2004

JON W. DUDAS
*Acting Director of the United States Patent and Trademark Office*